United States Patent
Li et al.

(10) Patent No.: US 6,260,948 B1
(45) Date of Patent: Jul. 17, 2001

(54) REDUCING GRANULARITY IN HIGHLIGHTS AND YELLOW FIELDS BY PLANE-DEPENDENT TABLES, IN DEVICE-STATE ERROR DIFFUSION

(75) Inventors: Guo Li; Francis E Bockman, both of San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/378,165

(22) Filed: Aug. 18, 1999

(51) Int. Cl.[7] .............................. B41J 2/21; B41J 29/393
(52) U.S. Cl. ............................ 347/43; 347/19; 358/1.9
(58) Field of Search ............................ 347/9, 43, 11, 347/19; 358/1.9

(56) References Cited

U.S. PATENT DOCUMENTS

| | | | |
|---|---|---|---|
| 5,473,446 | 12/1995 | Perumal, Jr. et al. | 358/523 |
| 5,657,137 | 8/1997 | Perumal, Jr, et al. | 358/502 |
| 5,861,896 | 1/1999 | Barton et al. | 347/358 |
| 5,923,344 | * 7/1999 | Norum et al. | 347/9 |
| 6,062,137 | * 5/2000 | Guo et al. | 101/171 |
| 6,081,344 | * 6/2000 | Bockman et al. | 358/1.9 |

\* cited by examiner

Primary Examiner—Thinh Nguyen

(57) ABSTRACT

Incremental printing apparatus preferably includes a system for steering the error-diffusion system to respond, to a near-gray or near-yellow input color, with a preselection of a color toward one color plane or toward another color plane. This is not a threshold system. Preferably the steering system operates toward one of the color planes depending on which plane is closer to an input color signal (which includes accumulated error from pixels processed previously, as well as the original signal for a pixel being processed). Preferably the apparatus essentially forecloses use of different inks in adjacent pixels, as distinguished from only modifying a likelihood of using different inks. Preferably the system operates in particular portions of color space that are near a yellow axis. Preferably the two color planes are a cyan and a magenta plane. Preferably the system minimizes granularity in highlight or near-yellow regions of a printed image by causing cyan colorant and magenta colorant in highlight or near-yellow regions to be deposited exclusively remote from one another. Preferably the steering system include portions of a lookup table, and the minimization is effected by contours (preferably diagonal) of permitted cyan and magenta colorant deposition within the table. The invention also includes a method of preparing the table.

32 Claims, 9 Drawing Sheets

```
                    ┌97
                      Yi = 0 LAYER IN HALFTONING TABLE        ┌96

C INK DROPS              M INK DROPS
       0000000000000000    97⁻  0111111111112234
       1100000000000000         0011111111112234
       1110000000000000         0001111111112234
       1111000000000000         0000111111112234
       1111100000000000         0000011111112234
       1111111111111111         0000001111112234
       1111111111111111         0000001111112234
       1111111111111111         0000001111112234
       1111111111111111         0000001111112234
       1111111111111111         0000001111112234
       1111111111111111         0000001111112234
       2222222222222222         0000001111112234
       2222222222222222         0000001111112234
       3333322333333333         0000001111112234
       3333333333333333         0000001111112234
       4444444444444444         0000001111112234
```

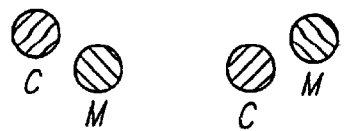
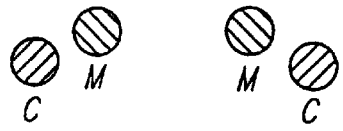
FIG. 12
PRIOR ART
FIG. 13
PRIOR ART
```
            Y = 0 LAYER IN HALFTONING TABLE
        C INK DROPS                M INK DROPS
     0000000000000000           0000001111112234
     0000000000000000           0000001111112234
     0000000000000000           0000001111112234
     0000000000000000           0000001111112234
     0000000000000000           0000001111112234
     1111111111111111           0000001111112234
     1111111111111111           0000001111112234
     1111111111111111           0000001111112234
     1111111111111111           0000001111112234
     1111111111111111           0000001111112234
     1111111111111111           0000001111112234
     2222222222222222           0000001111112234
     2222222222222222           0000001111112234
     3333322333333333           0000001111112234
     3333333333333333           0000001111112234
     4444444444444444           0000001111112234
```
FIG. 14
PRIOR ART

REDUCING GRANULARITY IN HIGHLIGHTS AND YELLOW FIELDS BY PLANE-DEPENDENT TABLES, IN DEVICE-STATE ERROR DIFFUSION

RELATED PATENT DOCUMENTS

Two closely related documents are copending, coowned U.S. utility-patent applications filed in the United States Patent and Trademark Office under the titles "Constructing Device-State Tables for Inkjet Printing", which is utility-patent application Ser. No. 08/960,766 (of the present inventors); and "Correlating Cyan and Magenta Planes for Error Diffusion Halftoning", identified as Hewlett Packard Company docket number PD-10970708-1, and subsequently assigned utility-patent application Ser. No. 08/880,475. These applications have since issued as U.S. Pat. Nos. 6,178,008 and 5,949,965. Other related co-owned documents are U.S. Pat. Nos. 5,473,446 and 5,657,137 of Perumal, and 5,861,896 of Barton. All four, and patent documents in turn cited therein, are hereby incorporated by reference in their entirety into this document.

FIELD OF THE INVENTION

This invention relates generally to machines and procedures for printing text or images (whether photo-like pictorial images or commercial-style graphics such as charts, graphs, color bands behind text, etc.) from individual ink spots created in a two-dimensional pixel array on a printing medium such as paper, transparency stock, or other glossy media. The invention relates more particularly to preliminary procedures that prepare data assemblages for later use in guiding the operation of an inkjet machine and method, and most particularly to formation of lookup tables that enable such a machine and method to select inkdrop combinations quickly, efficiently and ideally. The invention is also applicable, however, to other methodologies such as hot-wax transfer or xerographic printing. The invention was made for use in printing by error-diffusion techniques.

BACKGROUND OF THE INVENTION

1. Possibly Relevant Patents

A search of the patent literature returned the following U.S. patents, as well as the coowned patents mentioned earlier. U.S. Pat. Nos.

5,331,440 Kita 5,425,134 Ishida 5,719,956 Ogatsu 5,737,453 Ostromoukhov 5,739,917 Shu 5,742,405 Spaulding 5,805,178 Silverbrook 5,809,181 Metcalfe 5,857,063 Poe.

Of these, as will be seen the most relevant appears to be U.S. Pat. No. 5,739,917, issued to Joseph Shu of Seiko Epson.

2. Approximating a Color Continuum with a Limited Number of Discrete Colors

Photograph-like pictures are generally displayed on computer screens using "twenty-four-bit color"—a phrase which refers to eight bits for each of the additive primary colors red, green and blue. For each primary color the eight bits provide $2^8=256$ possible levels, ranging from none of the specified color to full saturation of that color.

Of course not all colors are primaries, but the computer screen can show combinations of any level of each of the three primaries. Therefore the number of possible colors that can be displayed in any single pixel is $256^3$, which comes to nearly seventeen million discrete colors.

Unfortunately most incremental printers—inkjet, or xerographic printers, for example—have a much smaller set of actually printable colorants. The simplest and best known of these devices is binary and usually provides the three subtractive primary colors cyan, magenta and yellow—plus black. The number of discrete colors that can be printed with such a unit is therefore only $2^4=16$ colors within a single pixel.

Some more-modern devices, however, instead have two different dilutions of some of the colorants—usually of magenta and of cyan, and sometimes of black. Furthermore, these devices may be able to provide varying numbers of inkdrops (or other quanta) of the colorants, for instance from zero to four drops of each of the different colorants in their different dilutions.

As a result, the number of discrete colorant combinations that can be produced within any single pixel may be, say, into the thousands. Even these numbers are obviously far smaller than seventeen million. As a practical matter furthermore, many of these combinations are very close to one another and hence essentially redundant—so there are not really as many discrete colors as there are of colorant combinations. Moreover many of the combinations are best forbidden because they would deposit too many drops of ink (too much liquid) in a single pixel.

Consequently, as will be seen later, the number of practically useful discrete colorant combinations may be roughly one hundred twenty-five. How can a 16-color or 125-color machine (or even a thousand-color machine) make colors that look like the colors in an original picture, if the original was able to use any of seventeen million colors?

What is usually done is to trade off some spatial resolution (very small pixels) for "color space" resolution. In other words, some of the printer's capability to produce extremely fine detail is sacrificed, and the system averages the available colors over some relatively large number of pixels.

The system accepts coarser resolution within the two-dimensional positional space of the image to obtain finer resolution within abstract color space. In this way, much finer color gradations are obtained.

The number of pixels used in the averaging process determines how close to 17 million colors the printer can get. One way in which this tradeoff is done is called "dithering".

Dithering is not closely relevant to the present invention. In the dithering approach a fixed, well-defined, usually rectangular cell of pixels (generally between two and thirty-two pixels) is used to produce a kind of color averaging within the cell. Although dithering works well for commercial graphics and other images that contain extended fields of uniform color, it has a tendency to generate within the image spurious visible patterning that is not usually acceptable for photograph-like images.

For photos, therefore, most workers prefer a different approach called "error diffusion". This system evaluates the original twenty-four-bit input color in a specific pixel to see what color available in the machine (for instance, which one of the one hundred twenty-five discrete colors that a machine can make in a single pixel) is closest to that input color.

Then the printer selects to print, and actually prints, that closest input color in the specific pixel—but it also evaluates the error in the printed color. This error is then distributed to several nearby pixels that have not yet been processed.

When the system later reaches one of those pixels, for processing, it adds to the input color in that pixel the previously allocated error from earlier-processed pixels—before making the assessment and printing decision mentioned above. In this way error is continuously propagated from pixel to pixel, and so is diffused, analogously to some component liquid in a continuous-dilution process in a liquid stream.

3. Basics of Underlying Device-State System

The present inventors' above-mentioned prior patent document advances the art of multiple-ink error diffusion by defining so-called "device states". This is where the one hundred twenty-five discrete colors come from—they are carefully precalculated and refined to provide an ideal "palette" of basic colors from which good approximations to all colors can be error-diffusion generated.

The device states, or palette colors, are worked out so that they not only provide an excellent source of colors for use in combinations but also are optimized in terms of the amount of liquid going into each pixel. The system of the related patent application operates very quickly and efficiently, based upon a lookup-table (LUT) approach in which not only the target device state but also the corresponding error is found in the table, thereby saving much computational time.

Thus the LUT has several thousand "major entries" from which to funnel down to the one hundred twenty-five available device states. The related patent application also introduces other procedural features that are significant overall but not important to the now-desired patent search.

4. The Printing of Grays; Black Replacement and Undercolor Substitution

An important and difficult aspect of color printing by almost any methodology is the selection of colorants for reproducing gray and near-gray constituents of colors, to produce best image quality—and particularly quality in highlight areas. First, grays and near grays may be regarded as dilutions of "black".

There are two principal ways to print black, whether in incremental printing or in older-fashioned printing-press systems: "single color" black, using real black ink, and "process black" which is produced as a common quantity of the three subtractive primaries cyan, magenta and yellow.

It is well known that in many situations it is desirable to substitute real black ink for a common fraction of the three subtractive primaries that may happen to be present in a particular desired color. This is a desirable thing to do in midtone regions of an image and also in shadow regions—because it consumes less ink, and puts less liquid onto the print medium, and for many people the single-color black looks blacker than the process black.

On the other hand, it is also known that in many situations it is desirable to go the other way—i. e. to substitute adjacent dots of the three subtractive primaries for real black. This is a desirable thing to do in the interest of obtaining a richer, deeper black (though perhaps not as "accurate" a black) in the midtone to lighter regions of an image—but more importantly in highlight regions, where the isolated dots of real black ink produce an excessively grainy appearance.

More specifically, when a desired shade of gray is very light, if the printer is to render such a shade purely in black ink, the printer is called upon to produce only a relatively few widely scattered or separated black dots—each of which is, at least in theory, dead black. This is the reason for the objectionable graininess.

The equivalent gray shade produced by adjacent or even partly overlapping dots of magenta, cyan and yellow is significantly more diffuse in appearance because, first, the individual dots are each lighter than the black dots would be; and second, the subtractive-secondary dots occupy a larger fraction of the space in the gray area.

By virtue of these two effects in combination, the gray tone is more diffusely distributed and hence less grainy. For present purposes, because yellow dots are much lighter than magenta and cyan dots, the yellow dots can be disregarded—and FIG. 12 can be seen as an approximation to the substitution of overlapping cyan and magenta dots for black-ink dots.

This prior-art technique does produce some improvement (increase) in overall diffuseness of the colorants and reduction of graininess. FIG. 12 does at the same time suggest, however, that the colorants (particularly the darker magenta and cyan) still remain very strongly clumped together—i. e. overlapping or even overprinted.

5. Known Highlight-Graininess Improvements in the Art: The Shu Patent

FIG. 13 illustrates a more definite improvement that appears in the prior art. The point is to ameliorate the graininess remaining in FIG. 12 by avoiding overlap while still holding the magenta and cyan in close association.

This is the solution offered in the previously mentioned Shu patent. Shu's abstract gives the general idea rather well, and this is echoed at column 6, lines 23 through 47.

The passage that appears most relevant to the present invention runs from column 6, line 47, through column 7 line 3. Shu's algorithm tries to avoid overlap of dots whenever possible, leading to dot positioning as suggested in FIG. 13.

Although there is no overlap of cyan and magenta dots, magenta dots are likely to appear next to cyan dots (column 6, line 61)—even when there is ample space between any two cyan dots. As a result each pair of coupled cyan and magenta dots will look like a large dark dot from typical viewing distance.

Although this result is somewhat better than overlapping the two dots of each pair, the granularity of the printed region is still high. The Shu patent, moreover, does not describe a device-state system.

Shu's approach operates by varying a threshold that depends on a relationship between the different color signals at each pixel of interest. As will be seen after introduction of the present invention, such a threshold-based algorithm is relatively awkward and inefficient. (The term "inefficient" is in effect a synonym for "slow", but making allowance for differences in time per processor operation for different types of computing equipment.)

In addition, although he says that he is concerned about making light colors look smoother, Shu's technique is not aimed at highlight regions in particular. Instead it is applied at rather high values of the CMY color signals, and analysis of his functional descriptions seems to suggest that he is most concerned about middle tones.

Perhaps the most interesting aspect of Shu's invention is the way in which it controls deposition of cyan and magenta after a decision to print either one of those two inks in a given pixel. In particular, referring to the other of those two inks, Shu says that his invention increases the "likelihood that ink will be deposited in neighboring pixels".

For example, if Shu's system has decided to print magenta in a particular pixel, then his system will increase the probability of printing cyan in neighboring pixels. Conversely, if Shu's system has decided to print cyan in a particular pixel, then the system will increase the probability of printing magenta in neighboring pixels.

This is precisely the reason for the result diagramed in FIG. 13 of the present document, which shows cyan and magenta dots C, M clustered closely—though concededly they are in separate pixels. For purposes of the present invention the graininess of such an inking pattern is considered unacceptable, or at least undesirable.

The graininess seen in such a scattering of even cyan and magenta dots, in close proximity to one another, somewhat approaches the graininess of black dots. This is true because these two colorants are the darker two constituents of process black.

Of course it is not as grainy as black-ink dots. Yet in a highlight or near-yellow region it is conspicuous and artificial-looking, certainly upon close inspection, and so remains objectionable.

The previously identified copending patent document addressed to "correlating Cyan and Magenta Planes" takes an approach that is conceptually somewhat related to Shu's system—and operates on-the-fly, which is relatively less efficient in comparison with a precalculated LUT approach. It is also somewhat related to the present invention, particularly in that it operates in the context of an error-diffusion system—and it achieves a result better than Shu's.

6. Known Improvements: The Poe Patent

The previously mentioned Poe patent teaches the use of generalized transforms that facilitate establishment of essentially any desired relationship—including arbitrary relationships—between colorants. Poe particularly addresses highlight regions, and particularly with regard to gray or near-gray colors.

As such, Poe's invention is extremely powerful. Poe, however, does not appear to teach a specific methodology for diminishing granularity—i. e. improving the diffuseness—beyond what is shown by, for example, Shu.

Moreover, Poe's teachings are not evidently directed to device-state systems. In addition, if his patented algorithm is applied to, for example, continuous dye-transfer printing, his job is done.

In inkjet printing, however, because the capability of a printhead to deliver ink is quantized—say, 10 pL per drop—it is necessary to use a halftone process to determine how many drops of CMYK ink are needed on each pixel. Poe's methodologies do not appear to extend this far; representatively the output of his algorithm is printer KCMY, which is twenty-four bits or continuous value and not yet halftoned.

7. Known Improvements: The Spaulding Patent

The previously mentioned Spaulding patent, like that of Shu, describes a system that operates on a threshold basis. Spaulding calculates a method of defining thresholds in multilevel halftoning, with the objective of creating output tones that are "approximately linear with perceived lightness".

Spaulding proceeds on a one-dimensional basis and treats CMY separately. This procedure, like threshold processing, is relatively cumbersome and inefficient.

Moreover, for each incoming CMY signal Spaulding's process always selects the ink state with minimum error defined as dC+dM+dY—that is, the algebraic sum of the individual errors dC, dM, dY in the three chromatic planes C, M, Y. In this regard Spaulding goes astray, since the true error distance in three-dimensional color space is instead the root sum square, i. e. the square root of $(dC)^2+(dM)^2+(dY)^2$.

8. Details of Underlying Device-State System

As noted above, a device-state error-diffusion algorithm uses a precalculated error-diffusion table to determine which ink combination to use and how the error is distributed. The device-state system thus inherently provides a built-in capability that can be exploited, simply by changing the table, to provide color performance originally not specifically intended.

Such changes in image character sometimes can be obtained with no change in hardware of current printers that are using a device-state error-diffusion algorithm such as presented in the present inventors' earlier patent document. As an example, FIG. 14 shows a portion of a halftoning table of sixteen by sixteen by sixteen (16×16×16=4,096) entries in accordance with the general principles of that earlier document—but restricted to a CMYK, i. e. four-ink, system.

For a related system, a three-ink (CMY) system operating at four passes for each region of the image, there will be about $5^3$=125 device states available. A previous approach allows the device state "zero" (0), defined as OC, OM, OY, OK, to be used for any major entry in the halftoning table.

More specifically, each major entry chooses the closest device state. In this case, the device state "zero" is chosen for more than one hundred major entries. FIG. 14 shows the previous choice of cyan and magenta inkdrops for the layer of major entries $0 \leq C_i \leq 15$, $0 \leq M_i \leq 15$, $Y_i=0$.

The present concern is the relatively grainy appearance that results from use of such a table, and in particular results in dot placements such as shown in FIG. 12 or 13. Particularly in highlight areas, where dots are scattered very sparsely overall, the overlapping or closely clustered cyan and magenta colorants appear as rather conspicuous dark dots.

The concern, however, also encompasses avoiding a similarly grainy appearance by avoiding deposition of cyan and magenta dots close together in a region where the amount of cyan and magenta is small. Such a region is not precisely the same as a "highlight region".

A highlight, by usual definition, is a region where there is very little color—mostly just white paper with a minor scattering of dots. As will be seen, however, this effect is also important in saturated-yellow regions.

9. Conclusion

Thus relative graininess of gray and near-gray features in highlight or near-yellow areas has continued to impede achievement of uniformly excellent inkjet printing—at high throughput—on all industrially important printing media. Thus important aspects of the technology used in the field of the invention remain amenable to useful refinement.

Summary of the Disclosure

The present invention introduces such refinement. This refinement produces a significant improvement, both theoretically and visually, over the present inventors' system of the previously mentioned copending Ser. No. 08/960,766 patent document.

The motivation for the invention is essentially an extension of the concern for graininess due to sparsely distributed black dots, discussed above. An objective of the invention is to eliminate even the somewhat diminished graininess due to clumped cyan and magenta dots such as occur in the systems of Shu and the above-mentioned Hewlett Packard patent document on "Correlating Cyan and Magenta Planes".

In its preferred embodiments, the present invention has several aspects or facets that can be used independently, although they are preferably employed together to optimize their benefits. In preferred embodiments of the first three of these facets or aspects, the invention has certain features or characteristics in common.

In particular, in all these first three aspects or facets the invention is incremental printing apparatus. Moreover, preferred embodiments of the invention in these first three facets all comprise a device-state error-diffusion system.

As has been previously suggested, these basic characteristics convey very important advantages. Nearly all halftoning decisions are made in advance—colorants to be printed, and error distributions as well, are to a large extent preselected, not worked out on the fly. This mode of operation is extremely efficient in terms of real time consumption.

Now in preferred embodiments of a first of its facets or aspects, in addition to the common characteristics just mentioned, the invention also includes a steering arrangement for substantially directly causing the error-diffusion system to respond in a certain specified way to a near-gray or near-yellow input color. More specifically, the steering arrangement causes the system to respond with a preselection of one color plane or another color plane, in a predefined color space. This response is provided substantially without reference to a threshold.

In preferred embodiments of a variant form of this first aspect, the invention includes some means for substantially directly steering response of the error-diffusion system, to a near-gray or near-yellow input color, toward one or another color plane. For purposes of breadth and generality in discussing the invention, these means will be called simply the "steering means". Again, operation of this variant of the first aspect of the invention is substantially without reference to a threshold.

The foregoing may constitute descriptions or definitions of the first facet of the invention in its broadest or most general forms. Even in these general forms, however, it can be seen that this aspect of the invention significantly mitigates the difficulties left unresolved in the art.

In particular, a first benefit is that closely similar colors are directed toward a common plane (either C or M but not both), unless they are across a dividing line between those two planes. Rather than allowing hundreds of different input colors to gravitate to device-state zero, as in the underlying system taught in the copending '776 application of the same inventors, the present invention preassigns input colors to cyan or magenta device states, respectively.

As a result, colors in successive pixels in a common field or grouping are channeled in common to a particular, specified rendition—rather than being permitted to drift back and forth across the neutral dividing line. In consequence, in a relatively uniform color region the system strongly resists printing first one primary (e. g. cyan) and then shortly after that a different primary (e. g. magenta).

The overall frequency of dot printing in a region is of course proportional to the overall density of colorant in that region in the input image. Hence in near-gray highlight regions or in a near-yellow field, cyan and magenta dots simply do not occur close together.

The substantial absence of reference to a threshold also confers a second important benefit. As mentioned in an earlier section of this document, threshold operations are generally less efficient in terms of the number of processing operations. The present invention instead preselects between device states, simply on the basis of the position found in a lookup table for a particular input signal with error accumulation.

Although this aspect of the invention in its broad form thus represents a significant advance in the art, it is preferably practiced in conjunction with certain other features or characteristics that further enhance enjoyment of overall benefits.

For example, preferably one of the two color planes is a cyan plane and the other is a magenta plane. It is also preferred that the steering means operate selectively toward the one color plane or toward the "another" color plane depending simply upon which of the two color planes is closer to an input color signal. In other words, it is this criterion that is used instead of a threshold.

It is also preferred that the steering means operate by preselection, based upon relative proximity of the input signal to one of the two color planes. In this case the input signal includes the original signal for a pixel being processed, plus accumulated error distributed to that pixel from other pixels processed previously.

Yet another preference is that the steering means, within particular portions of the color space, substantially foreclose use of different inks in adjacent pixels, as distinguished From only modifying a likelihood of using different inks in adjacent pixels. Also preferably the particular portions of color space are near a yellow axis.

Most preferably the steering means include portions of a lookup table. The steering means, however, are not to be interpreted as limited to implementation in the form of a lookup table, and various other implementations are within the scope of the appended claims.

For example, the steering means might take the form of rapid classifications and decision-making carried out in a very fast specialized, dedicated coprocessor. (Such an implementation might be equivalent in the quality of the resulting printed images, and in terms of speed—but would probably be much less economical.)

In preferred embodiments of a second of its independent aspects, the invention—in addition to the common characteristics introduced earlier—includes a foreclosing arrangement for generally preventing use of different color inks in adjacent pixels. It is to be understood that the phrase just used, "preventing use of different color inks", is as distinguished from only modifying a likelihood of using different inks (as in the Shu system discussed in a previous section of this document). The foreclosing arrangement operates only with respect to particular portions of color space.

In a variant of this second main facet of the invention, the invention includes color-space means for selectively foreclosing use of different color inks in adjacent pixels. Again this phrase "selectively foreclosing use of different color inks" is to be distinguished from only modifying a likelihood of using different inks.

In yet another variant of this second principal aspect, the invention includes some means for generally foreclosing use of different color inks in adjacent pixels. Here too for generality and breadth these means will be called simply the "foreclosing means".

The foreclosing means operate with respect to particular portions of color space. Operation of the foreclosing means—like that of the "foreclosing arrangement" and the "color-space means" discussed in the first two variants immediately above—is as distinguished from only modifying a likelihood of using different inks in adjacent pixels.

The foregoing may constitute descriptions or definitions of the second facet of the invention in its broadest or most general forms. Even in these general forms, however, it can be seen that this aspect of the invention too significantly mitigates the difficulties left unresolved in the art.

In particular, this facet of the invention as applied prevents clumping of cyan and magenta in highlight or near-yellow regions and other particular portions of color space as preferred (see below). In this way it avoids the graininess that is diagramed in FIG. 13 as well as that of FIG. 12.

Although this second aspect of the invention in its broad form thus represents a significant advance in the art, it is preferably practiced in conjunction with certain other features or characteristics that further enhance enjoyment of overall benefits.

For example, it is preferred that the foreclosing means operate selectively toward said one or another color plane, depending on which of two color signals is bigger. It is also preferred that the "particular portions" of color space are near a yellow axis. Further preferably the foreclosing means include portions of a lookup table.

In preferred embodiments of a third basic aspect or facet, the invention includes—in addition to the previously mentioned common features—a minimizing arrangement for causing granularity in highlight or near-yellow regions of a printed image to be substantially as small as possible. The minimizing arrangement does this by causing cyan colorant and magenta colorant in highlight or near-yellow regions to be deposited exclusively remote from one another.

A variant of this third independent facet of the invention instead includes some means for minimizing granularity in highlight or near-yellow regions of a printed image. Again for breadth and generality these means will be called the "minimizing means". As with the minimizing arrangement mentioned just above, these means work by causing cyan colorant and magenta colorant in highlight or near-yellow regions to be deposited exclusively remote from one another.

The foregoing may represent descriptions or definitions of the third aspect or facet of the invention in its broadest or most general forms. Even as couched in these broad terms, however, it can be seen that this facet of the invention importantly advances the art.

In particular, it will be noted that this third aspect of the invention approaches the problem of granularity from a diametrically different perspective than the Shu patent. Whereas Shu attempts to encourage the positioning of magenta and cyan in adjacent pixels of high-light regions, the present invention operates by deterring such positioning. Specifically, this facet of the invention disposes cyan and magenta dots as far away from each other as possible, thus maximizing the diffuseness or smoothness of colorant in highlight or near-yellow regions.

Although the third major aspect of the invention thus significantly advances the art, nevertheless to optimize enjoyment of its benefits preferably the invention is practiced in conjunction with certain additional features or characteristics. In particular, preferably the minimizing means include contours of permitted cyan and magenta colorant deposition within a lookup table that controls the system.

In this case preferably the contours are substantially diagonal. More specifically, the lookup table preferably has portions substantially as in FIG. 2.

In preferred embodiments of a fourth, fifth and sixth of its aspects, the invention takes the form of a method. More specifically the fourth aspect of the invention is a method of preestablishing a lookup table for use by a device-state error-diffusion algorithm. The algorithm, in turn, is for use in an incremental printing apparatus.

The method includes the step of—for each of two color planes—establishing in the lookup table a respective contour that defines a selection of colorants near a particular color axis. The two respective contours represent mutually exclusive complementary selections of colorants.

The method also includes the step of—near the particular color axis in each of the two planes—filling in zeroes on one side of a respective one of the contours. This step is completed by filling in ones on the other side of that same contour.

The foregoing may represent a description or definition of the fourth aspect or facet of the invention in its broadest or most general form. Even as couched in these broad terms, however, it can be seen that this facet of the invention importantly advances the art.

In particular, by applying this extremely simple constraint in configuring the colorant selection profile in a lookup table the system designer achieves an enormous improvement in the smoothness of presentation of colorants in highlight or near-yellow regions. It must be noted that this constraint, when used at the factory in setting up system memory for a new machine but in a preexisting, underlying system, is absolutely cost-free.

Furthermore this refinement can be applied even as a field upgrade, at extremely minimal cost of time and trouble—provided only that provision for such revision of the LUT has been built into the system. As only a very small fraction of the table need be revised, even a field upgrade would require only a moment of actual memory-writing time.

The fourth major aspect of the invention thus significantly advances the art. Nevertheless to optimize enjoyment of its benefits preferably the invention is practiced in conjunction with certain additional characteristics or features.

In particular, preferably the establishing step establishes the two color planes as cyan and magenta planes, respectively, and the particular color axis is a yellow axis. Also preferably the establishing step establishes both said two respective contours as diagonals.

As to preferred embodiments of each of a fifth and a sixth of its aspects, the invention is a method of reducing image granularity in a printed image. The method includes the step of establishing a halftoning table for facilitating the converting of a fine-resolution color value to a coarse-resolution color value. The table has a plurality of device-state error-diffusion values.

The method also includes the step of selecting from the halftoning table:
  a device state composed of only one drop of cyan or magenta, if a cyan color value in the fine-resolution color value exceeds or equals a magenta color value in the fine-resolution color value, and
  otherwise selecting another device state composed of only one drop of magenta or cyan respectively.

Now more specifically as to the fifth aspect, the image is one that is formed from a plurality of droplets of cyan ink, magenta ink and yellow ink. The selection of either the threshold device-state error diffusion value or the "another" threshold device-state error diffusion value facilitates printing of the image in such a way that each droplet of magenta ink is spaced a maximum distance from each droplet of cyan ink.

Turning to the sixth aspect of the invention, the image to be printed is an inkjet image. The selection of either the device-state composed of only one drop of cyan or magenta or the "another" device-state composed of only one drop of magenta or cyan respectively facilitates the printing of the inkjet image with adjacent droplets of cyan ink and magenta ink distributed in a substantially spatially even pattern.

All of the foregoing operational principles and advantages of the present invention will be more fully appreciated upon consideration of the following detailed description, with reference to the appended drawings, of which:

BRIEF DESCRIPTION OF THE DRAWINGS

FIG. 12 is a diagram like FIG. 1 but representing early prior art that simply overprints or overlaps magenta and cyan;

FIG. 13 is a like diagram but representing more relevant prior art that positions cyan and magenta adjacent to each other;

FIG. 14 is a portion of an LUT like FIG. 2 but according to the same inventors' earlier system of the '766 document.

DETAILED DESCRIPTION OF THE PREFERRED EMBODIMENTS

1. Philosophy of the Invention

The motivation for the invention is essentially an extension of the concern for graininess due to sparsely distributed black dots, discussed in the background section of this document. The present invention takes this concern to a further level of refinement.

As that earlier discussion of FIGS. 12 and 13 makes clear, the graininess seen in a scattering of even cyan and magenta dots, in close proximity to one another as in the Shu patent, somewhat approaches the graininess of black dots. This is true because these two colorants are the darker two constituents of process black.

Of course it is not as grainy, but still in a highlight or near-yellow region it is conspicuous and artificial-looking, certainly upon close inspection, and so is still objectionable. The present invention addresses the previously described concern for this residual graininess, and successfully avoids this grainy look by avoiding deposition of cyan and magenta dots close together in a region where the amount of cyan and magenta is small.

Instead magenta and cyan dots M, C (FIG. 1) are scattered more uniformly throughout the image region. The present invention not only tries to avoid overlapping of dots whenever possible, but also tries to place the dots as evenly (in terms of spatial distribution) as possible.

In other words, the invention tends to position magenta dots as far away from cyan dots as possible. This is accomplished simply by placing ones and zeroes in the lookup tables 96 (FIG. 2) in grouping with diagonal contours 97, in color-space regions and image regions where the amount of cyan and magenta is small.

Figures 1, 2:
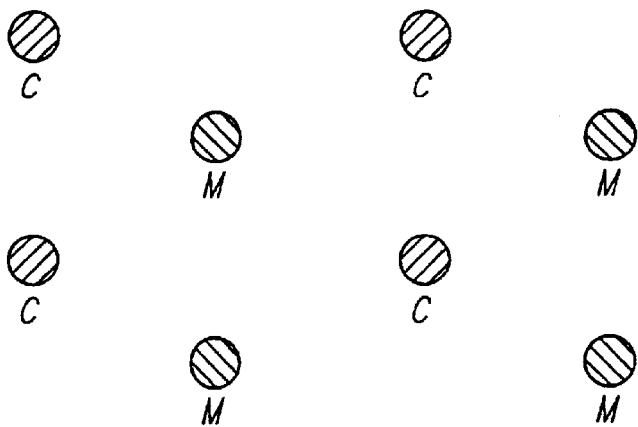
FIG. 1 is a schematic diagram showing relative placement of cyan and magenta inkdrops in an image printed according to preferred embodiments of the invention.
FIG. 2 is a pair of color planes (cyan and magenta) in a representative but small lookup table (LUT) such as might be used in accordance with the present invention to achieve the FIG. 1 placements.

The tabulation of FIG. 2 has a general format like FIG. 14—discussed earlier and conforming to the earlier '766 document of the present inventors. Thus each tabulation is a 16×16×16 example of a halftoning table, and shows choices of cyan and magenta inkdrops for the layer of major entries $0 \leq C_i \leq 15$, $0 \leq M_i \leq 15$, $Y_i = 0$.

The FIG. 2 tabulation, however, represents choices in accordance with preferred embodiments of the present invention. In particular it can be noticed that FIG. 2 diverges very distinctly from FIG. 14 in the uppermost five lines of numerals—corresponding to color-space and image regions where the amount of magenta and cyan is small.

The tabular example given in FIG. 2 corresponds to a somewhat simplified case of a CMYK four-ink system. To those skilled in the art, however, it will be clear that the present invention is also straightforwardly applied in the context of the six-ink system introduced in the '766 document, as well as virtually any other device-state error-diffusion inking system of interest.

As previously pointed out, such a region in an image is not precisely the same as a "highlight region"—i. e. by usual definition a region where there is very little color, mostly just white paper with a minor scattering of dots. Nevertheless the tutorial discussion here will focus first upon the classically defined highlight region.

Figure 3:
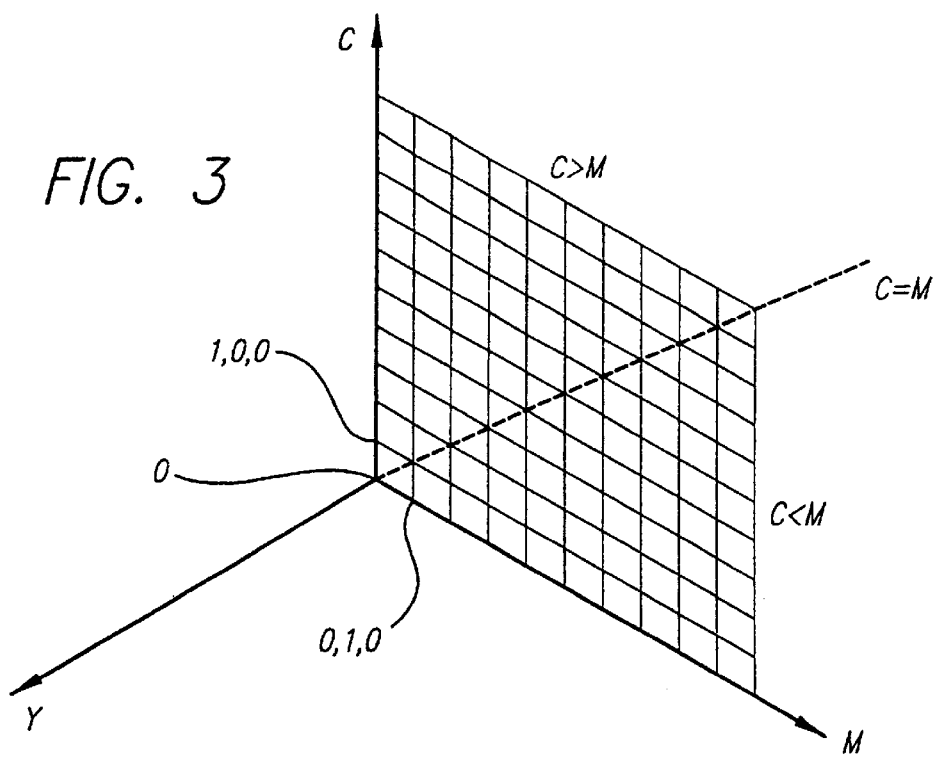
FIG. 3 is a conceptual graph of three-dimensional color-space, particularly showing the cyan-magenta plane (near the yellow axis) and a line of division therein midway between the cyan and magenta axes and passing through the origin—generally in accordance with a demarcation contour in the FIG. 2 LUT.

That zone may be identified as the region near the origin of the three subtractive-primary color-space axes C, M and Y (FIG. 3). In other words, a highlight region is basically the region near zero (0) in the diagrams.

The specific methodology adopted, to avoid printing cyan and magenta dots together, focuses on this color space near the origin and particularly upon the 45-degree line C=M in the C-M plane. FIG. 3 is annotated to show that in the region of the C-M plane above that line C is greater than M (in mathematical notation, C>M), and in the region below that line C is less than M (again in math notation C<M or of course M>C).

The present inventors' methodology forces the system to use dots that are only cyan or only magenta—depending on which way the input color is slightly inclined—rather than letting the system print both cyan and magenta dots intermingled. Thus for example in FIG. 3 if a color is near the origin in the C-M plane and is even very slightly above the 45-degree line, it is steered (by the preestablished contours 97 of ones and zeroes in the LUT 96) toward the cyan axis—and conversely if below the line.

Figure 4:
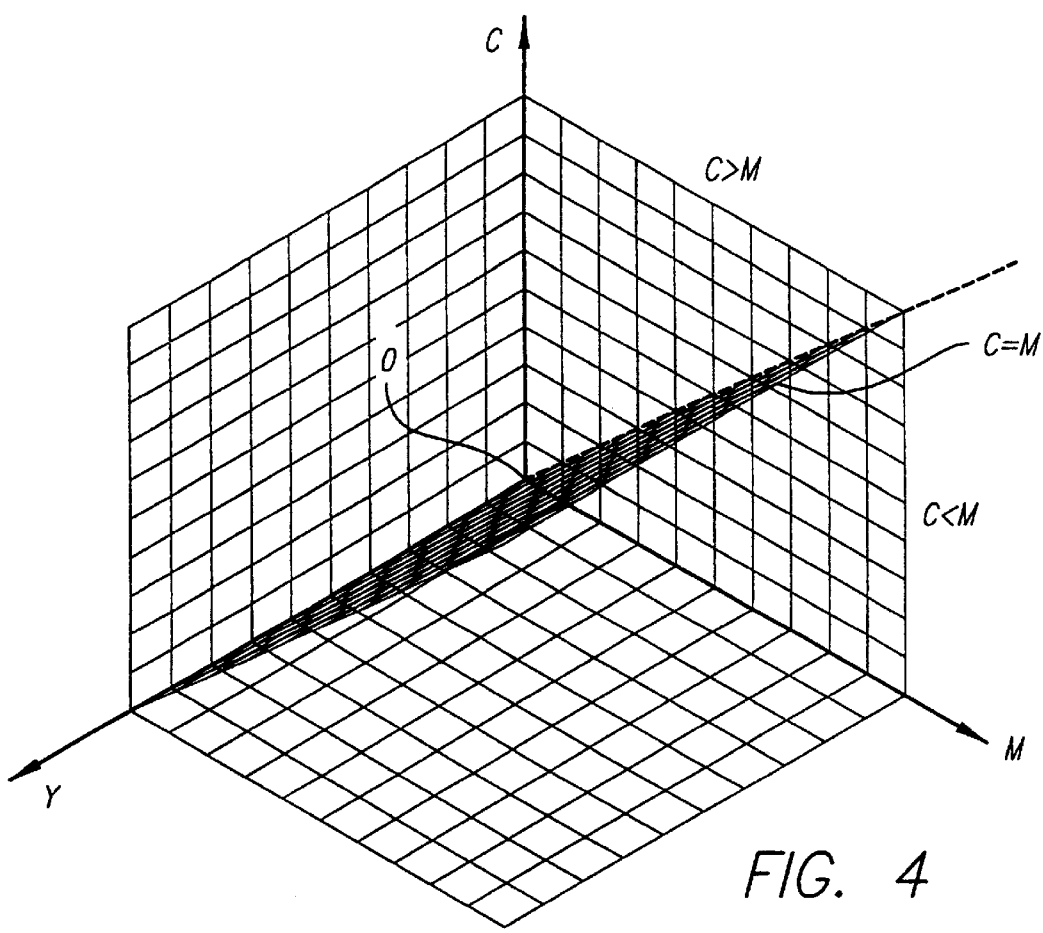
FIG. 4 is a like graph showing instead a plane of division, in the color space, passing through the yellow axis and likewise in accordance with the same demarcation contour of the FIG. 2 LUT.

With that orientation in mind, it will be clear that throughout the color space as shown in FIGS. 3 and 4, the same two conditions C>M and C<M apply above and below the plane of cyan-magenta equality C=M (FIG. 4) that passes through the Y axis. Thus beneficial operation of the invention is not limited to highlight regions but also comes into play even in regions that have high saturation of yellow.

2. Preassignment Details

The condition is established that, in essence, only input colors actually at the origin shall be permitted to use the origin as the selected device state. Other colors very near the origin are not permitted to gravitate to the origin.

Instead they are routed, if in the C>M region initially, to a device state along the C-axis—namely the point 1,0,0 (in arbitrary color-space units, FIG. 3). If they are in the C<M region initially, they are instead routed to a device state along the M-axis, specifically the illustrated point 0,1,0.

This treatment, however, strictly speaking is not constrained to regions near the origin, but also is employed in yellow washes—even quite saturated yellow washes. Thus it is only limited to regions of color space quite near the yellow axis.

There are two logical bases for this preferred approach. First, because yellow is a color of relatively very high lightness, these latter regions are akin to highlights. Second, the problem of graininess is if anything more acute in regions near the Y-axis but for from the C-Y plane, because in such regions the greater admixture of yellow dots intimately adjoining the cyan and magenta dots even more strongly approximates black.

In the preferred embodiments of the invention, it is the contoured groupings of ones and zeroes in the lookup tables—which implement the preestablished assignments discussed here—that actually are the steering arrangement, or steering means, introduced in the earlier "summary" section of this document. This is readily understood since these numerical values in the LUT very definitively steer certain input colors toward one or the other of the cyan or magenta axes and in fact to the specific 1,0,0 (cyan) and 0,1,0 (magenta) device states identified just above.

At the same time in the preferred embodiments these contoured groups of zeroes and ones in the LUTs—which, once again, implement those same preestablished assignments—also serve as the foreclosing arrangement, or foreclosing means, also introduced in that summary section. This too is straightforwardly understood, as the LUT equally definitively assigns other input colors away from the opposite axes (magenta or cyan respectively).

Figure 5:
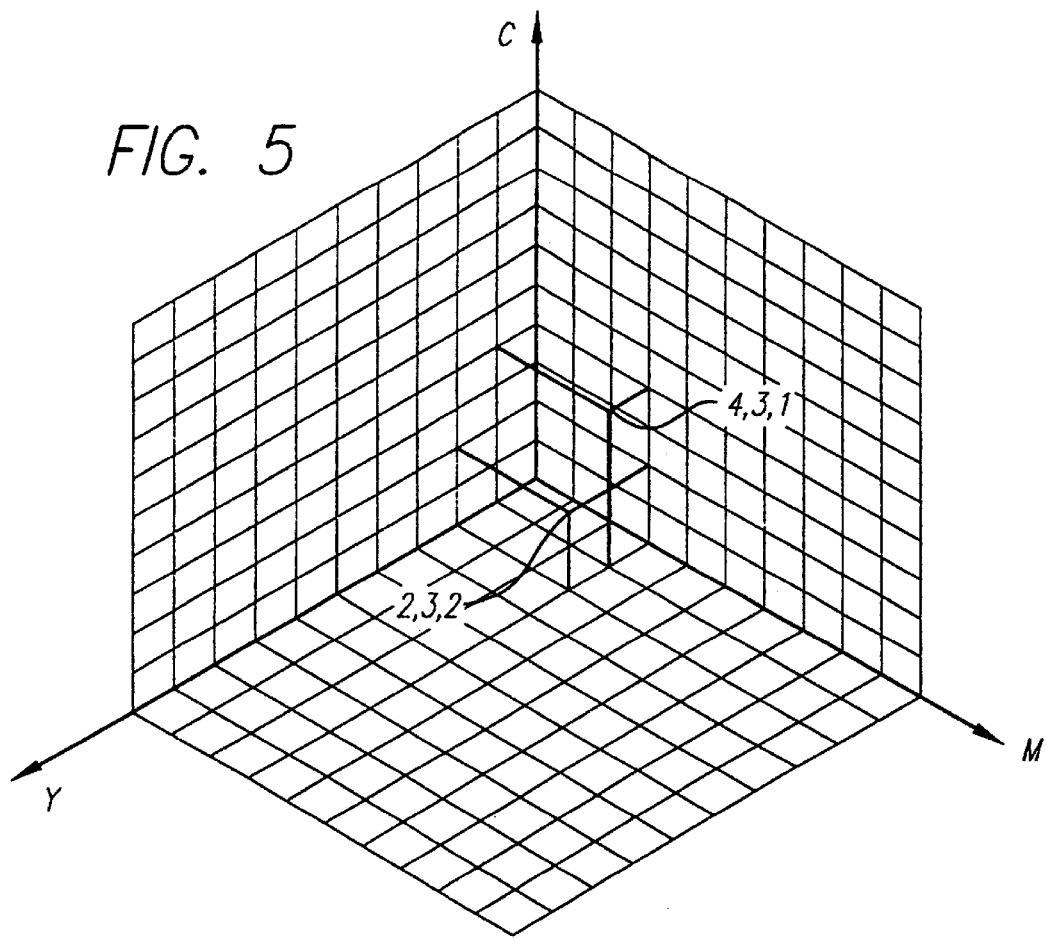
FIG. 5 is a like graph showing instead two color points that are nearby each other but on opposite sides of the FIG. 3 line and FIG. 4 plane of division and so printed mutually remote from each according to the invention.

As an example of processing according to these conditions, consider two points 4,3,1 and 2,3,2 (FIG. 5) in subtractive-primary color space, near the origin. Though only about 2½ units apart, one point is assigned to the device state 1,0,0 and the other to the device state 0,1,0.

Like assignments are preestablished for colors even much closer to the plane of equality. Colors precisely within that plane—and still near the Y-axis—are also assigned arbitrarily, by the contours 97 of zeroes and ones in the LUT 96, to one or the other of the two device states just identified.

Thus the plane-dependent feature of the invention is basically exploiting a built-in characteristic of the underlying device-state error-diffusion system. Depending on the way the LUT is built, the output image may have any of a great variety of properties or patterns, and in the present invention the particular property implemented is diffuseness of dot placement near the yellow axis.

Device-state error diffusion incorporates a three-dimensional lookup-table methodology, which does not have obvious thresholds for C, M or Y, let alone vary a threshold as in Shu. Instead all the output data in the tables are precalculated.

In device-state error diffusion, all input color entries in a small three-dimensional region of color space have the same output device state. The state is selected from all available device states based upon the three-dimensional distance within the color space.

In particular the present invention tries to select the ink state with minimum error $(dC)^2+(dM)^2+(dY)^2$, as well as of course the minimum square root of this expression—i. e., true three-dimensional distance error. In addition the device-state selection is subject to certain rules as discussed in the '766 document.

It is possible that other systems may be analogously exploited, within the scope of certain of the appended claims, to provide analogous image-quality results. The known teachings of those other systems, however, do not include any suggestion of such exploitation or of such results.

Thus for instance the Shu methodology may be able to generate analogous results if Shu's higher threshold is set to 255 and his lower threshold to 1; however, Shu's system is not a device-state error-diffusion system. Similarly it would appear that the Poe methodology may be able to provide analogous results if Poe's arbitrary functions are defined to do so.

3. Basic Hardware for Implementation of the Invention

Figure 6:
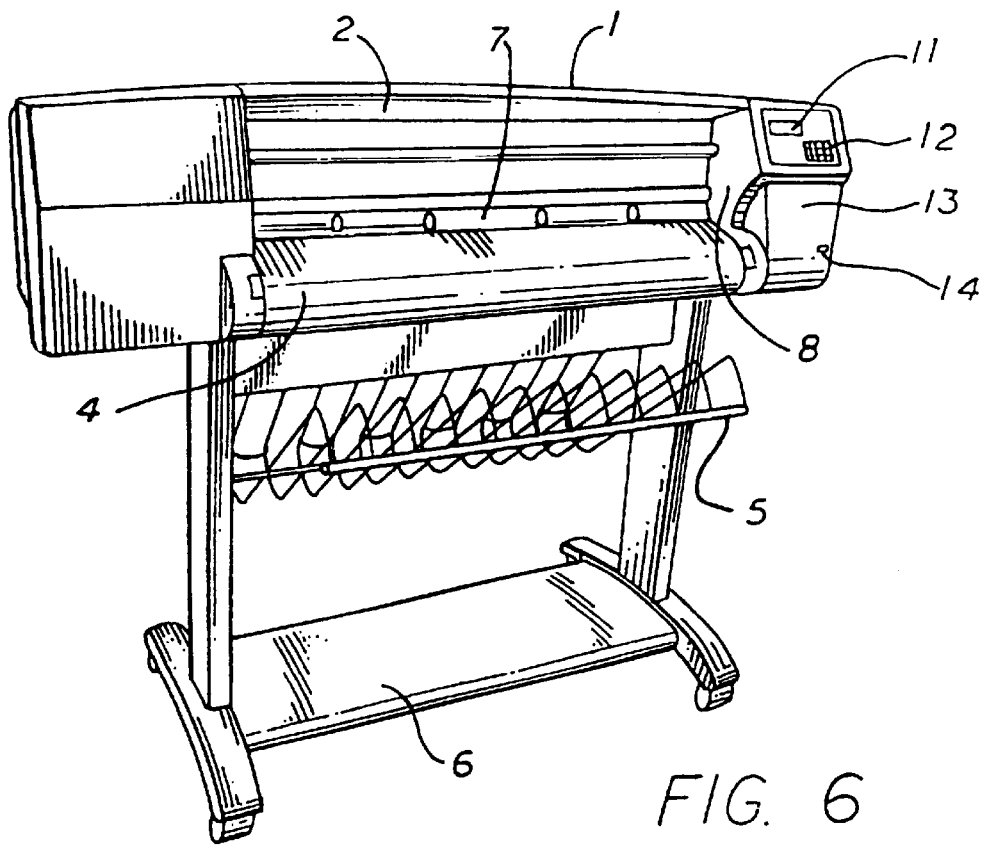
FIG. 6 is an isometric or perspective exterior view of a large-format printer-plotter which is a preferred embodiment of the present invention, and which can be used to implement the relationships of FIGS. 1 through 5.

One preferred printer/plotter includes a main case 1 (FIG. 6) with a window 2, and a left-hand pod 3 that encloses one end of the chassis. Within that pod are carriage-support and -drive mechanics and one end of the printing-medium advance mechanism, as well as a pen-refill station containing supplemental ink cartridges.

The printer/plotter also includes a printing-medium roll cover 4, and a receiving bin 5 for lengths or sheets of printing medium on which images have been formed, and which have been ejected from the machine. A bottom brace and storage shelf 6 spans the legs which support the two ends of the case 1.

The invention, however, is equally applicable to a much smaller tabletop printer for producing small photograph-like images (or office-size documents). The procedures and systems of the invention are substantially independent of image size and format, and thus independent of machinery size and format as well.

Just above the print-medium cover 4 is an entry slot 7 for receipt of continuous lengths of printing medium 4. Also included are a lever 8 for control of the gripping of the print medium by the machine.

A front-panel display 11 and controls 12 are mounted in the skin of the right-hand pod 13. That pod encloses the right end of the carriage mechanics and of the medium advance mechanism, and also a printhead cleaning station. Near the bottom of the right-hand pod for readiest access is a standby switch 14.

Figure 7:
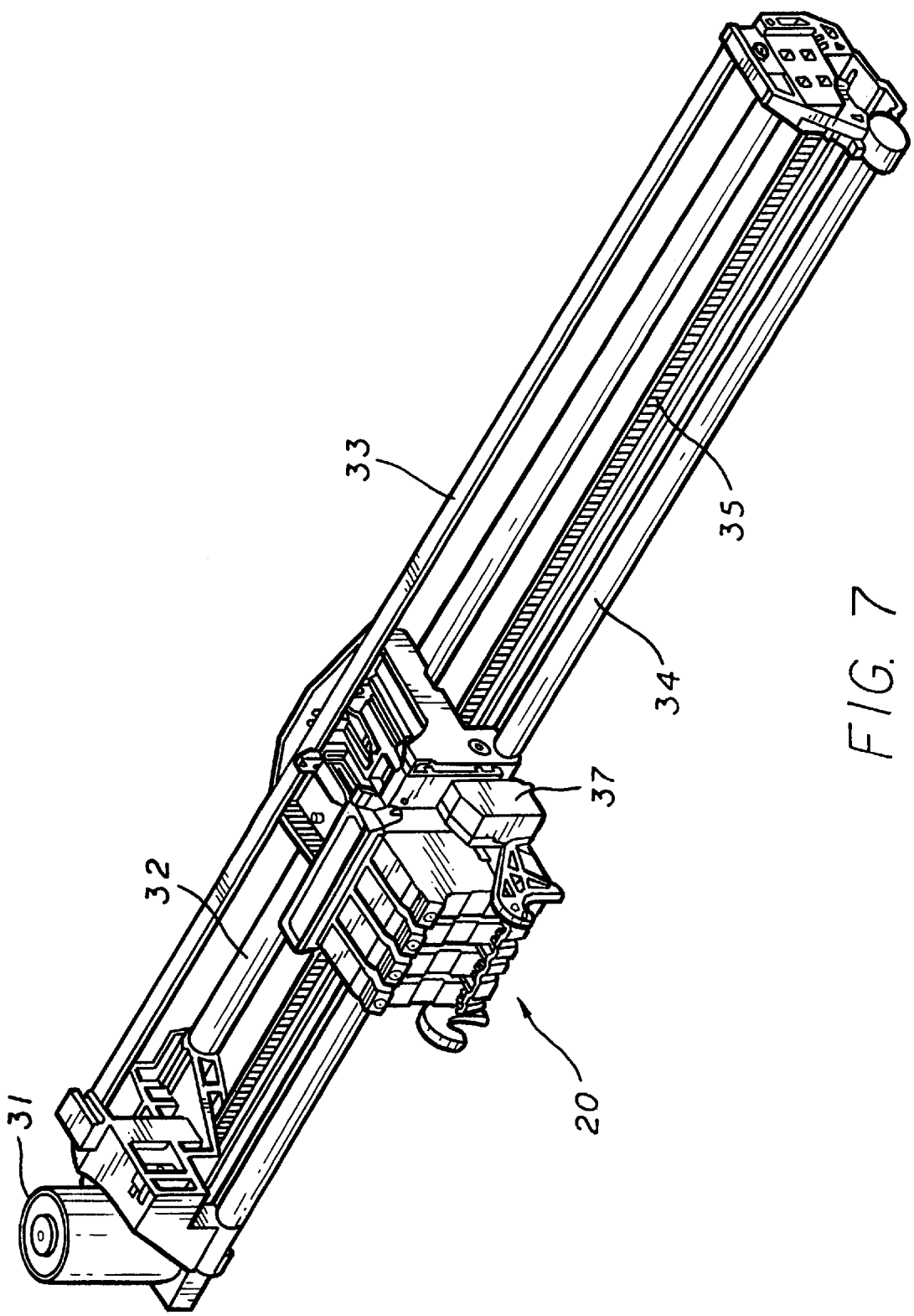
FIG. 7 is an isometric view, taken from front above left, of a carriage and carriage-drive mechanism which is mounted within the case or cover of the FIG. 6 device.

Within the case 1 and pods 3, 13 the carriage assembly 20 (FIG. 7) is driven in reciprocation by a motor 31—along dual support and guide rails 32, 34 through the intermediary of a drive belt 35. The motor 31 is under the control of signals 57 from a digital electronic microprocessor (essentially all of FIG. 11 except the print engine 50). In a block diagrammatic showing, the carriage assembly 20 travels to the right 55 and left (not shown) while discharging ink 54.

A very finely graduated encoder strip 33 is extended taut along the scanning path of the carriage assembly 20, and read by an automatic optoelectronic sensor 133, 233 to provide position and speed information 52 for the microprocessor. (In FIG. 11, signals in the print engine are flowing from left to right except the information 52 fed back from the encoder sensor 233—as indicated by the associated leftward arrow.)

The codestrip 33 thus enables formation of color inkdrops at ultrahigh resolution (typically 24 pixels/mm) and precision, during scanning of the carriage assembly 20 in each direction.

Figure 8:
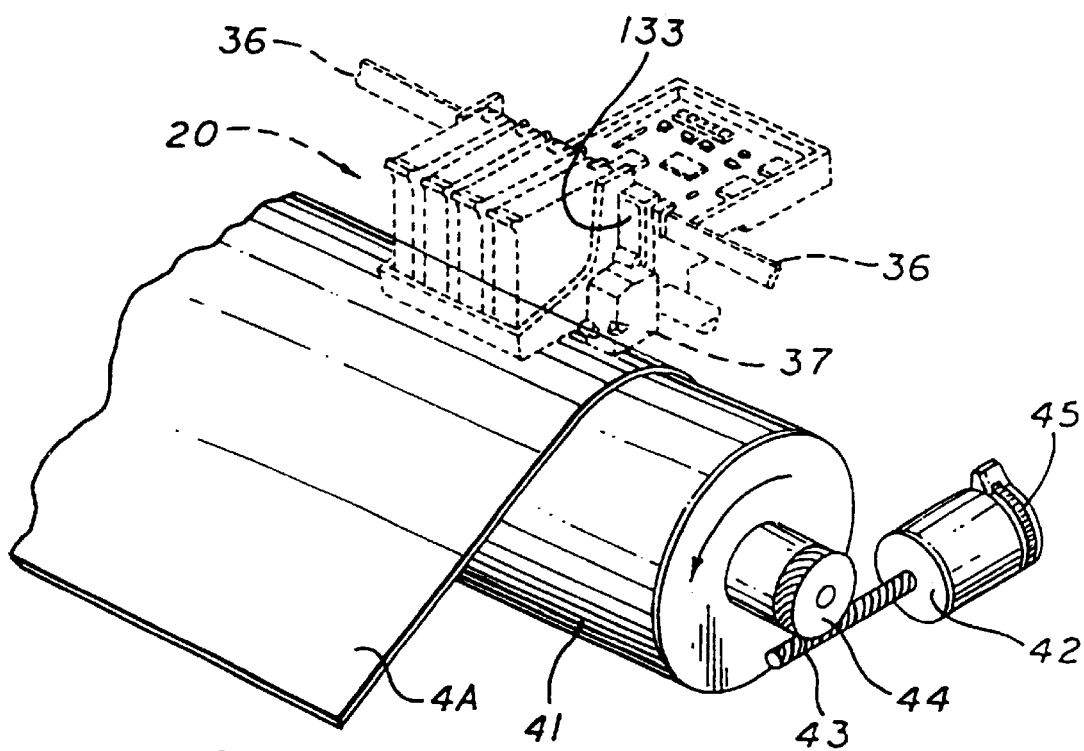
FIG. 8 is a like view of a printing-medium advance mechanism which is also mounted within the case or cover of the FIG. 6 device, in association with the carriage as indicated in the broken line in FIG. 7.

A currently preferred location for the encoder strip 33 is near the rear of the carriage tray (remote from the space into which a user's hands are inserted for servicing of the pen refill cartridges). Immediately behind the pens is another advantageous position for the strip 36 (FIG. 8). The encoder sensor 133 (for use with the encoder strip in its forward position 33) or 233 (for rearward position 36) is disposed with its optical beam passing through orifices or transparent portions of a scale formed in the strip.

A cylindrical platen 41 (FIG. 8)—driven by a motor 42, worm 43 and worm gear 44 under control of signals 46 from the processor 15—rotates under the carriage-assembly 20 scan track to drive sheets or lengths of printing medium 4A in a medium-advance direction perpendicular to the scanning. Print medium 4A is thereby drawn out of the print-medium roll cover 4, passed under the pens on the carriage 20 to receive inkdrops 54 for formation of a desired image, and ejected into the print-medium bin 5.

Figure 9:
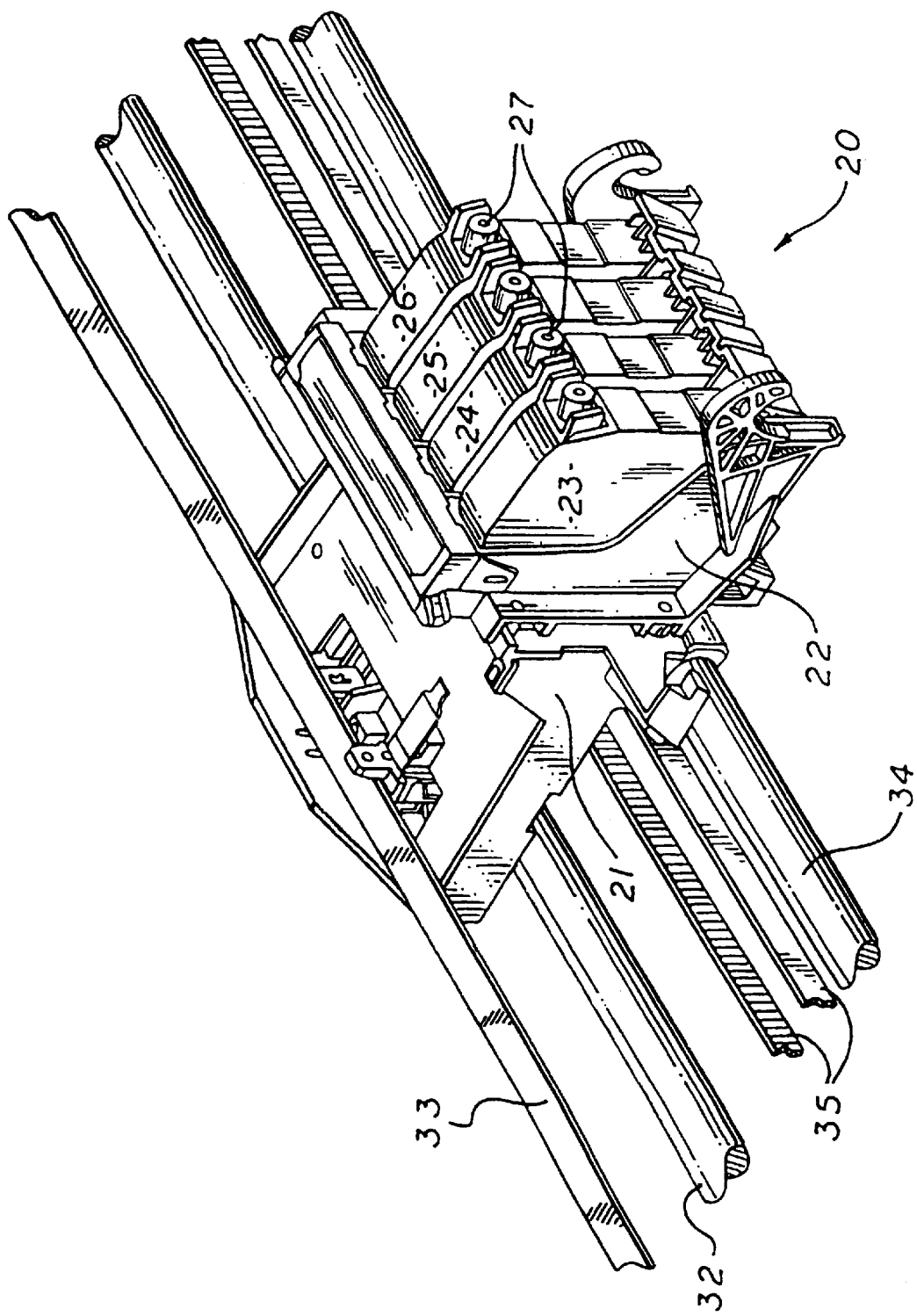
FIG. 9 is a like but more-detailed view of the FIG. 7 carriage, showing the printheads or pens which it carries.

The carriage assembly 20 includes a previously mentioned rear tray 21 (FIG. 9) carrying various electronics. It also includes bays 22 for preferably four pens 23–26 holding ink of four different colors respectively—preferably cyan in the leftmost pen 23, then magenta 24, yellow 25 and black 26.

Figure 10:
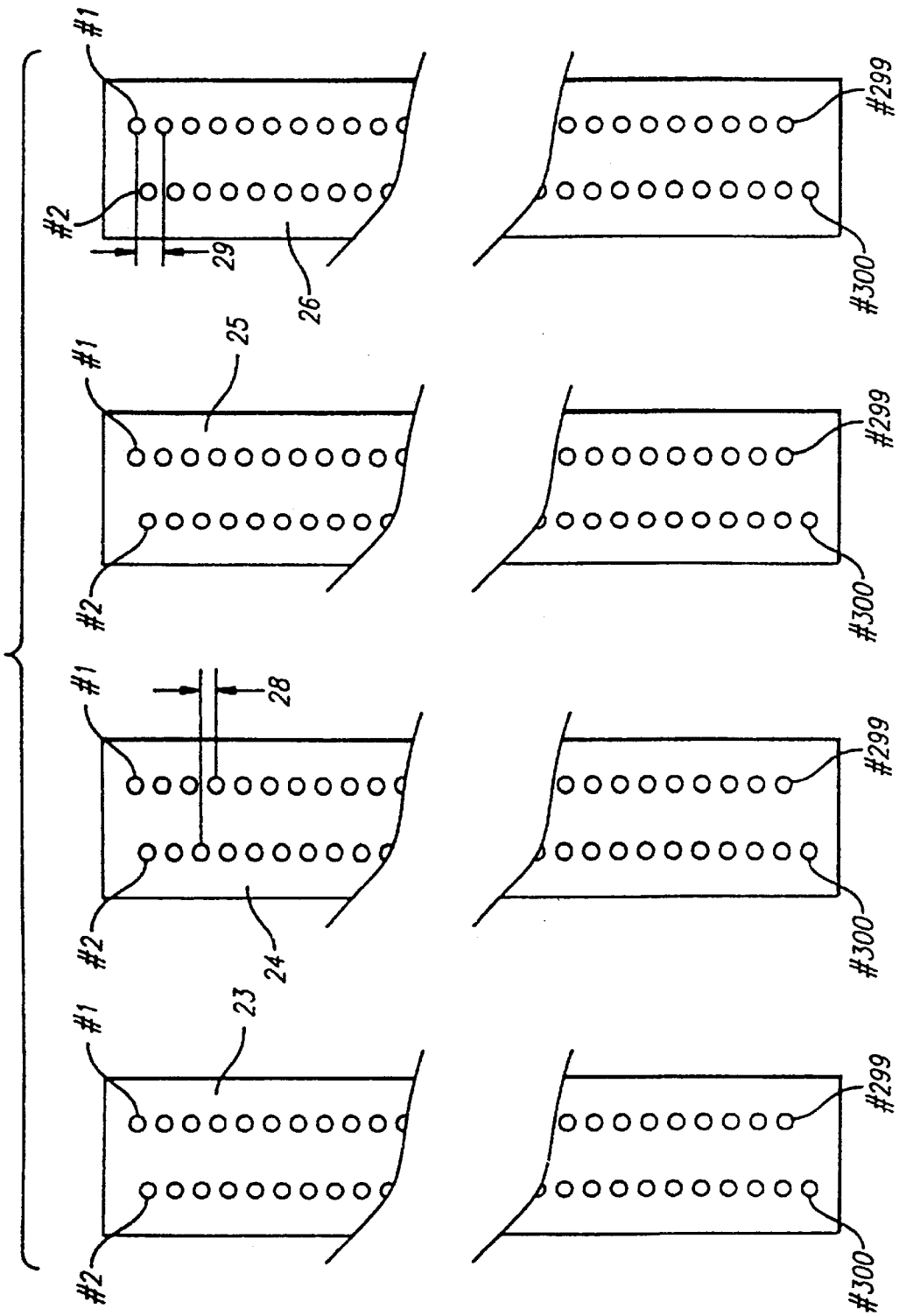
FIG. 10 is a bottom plan of the printheads or pens, showing their nozzle arrays.

Each of these pens, particularly in a large-format printer/plotter as shown, preferably includes a respective ink-refill valve 27. The pens, unlike those in earlier mixed-resolution printer systems, all are relatively long and all have nozzle spacing 29 (FIG. 10) equal to one-twelfth millimeter—along each of two parallel columns of nozzles. These two columns contain respectively the odd-numbered nozzles 1 to 299, and even-numbered nozzles 2 to 300.

The two columns, thus having a total of one hundred fifty nozzles each, are offset vertically by half the nozzle spacing, so that the effective pitch of each two-column nozzle array is approximately one-twenty-fourth millimeter. The natural resolution of the nozzle array in each pen is thereby made approximately twenty-four nozzles (yielding twenty-four pixels) per millimeter, or 600 per inch.

Preferably black (or other monochrome) and color are treated identically as to speed and most other parameters. In the preferred embodiment the number of printhead nozzles used is always two hundred forty, out of the three hundred nozzles (FIG. 10) in the pens.

This arrangement allows for software/firmware adjustment of the effective firing height of the pen over a range of ±30 nozzles, at approximately 24 nozzles/mm, or ±30/24= ±1¼ mm. This adjustment is achieved without any mechanical motion of the pen along the print-medium advance direction.

Alignment of the pens can be automatically checked and corrected through use of the extra nozzles. As will be understood, the invention is amenable to use with great variation in the number of nozzles actually operated.

4. Microprocessor Hardware

Traditionally the image-processing pipeline in inkjet printers is composed of at least three stages:
1. colormapping (image RGB or device-independent L*a*b*, 3×8=24 bits, to printer RGB, 3×8=24 bits),
2. color separation (printer RGB, 3×8=24 bits, to printer CMYK, 3×8=24 bits), and
3. halftoning or "rendition" (printer CMYK, 3×8=24 bits, to printer inkdrop number, $C_d M_d Y_d K_d$, 4×2 or 3=8 or 12 bits).

Preferred embodiments of the present invention may be conceptualized as basically working in the halftoning/rendition stage, though it also has some features of color separation.

Input of preferred embodiments is printer CMY (twenty-four bits). Their output is halftoned value: drop numbers of cyan, magenta, yellow & black ink (4×2=8 bits).

(a) Basic processing options—Data-processing arrangements for the present invention can take any of a great variety of forms. To begin with, image-processing and printing-control tasks 332, 40 can be shared (FIG. 11) among one or more processors in each of the printer 320 and an associated computer and/or raster image processor 30.

A raster image processor ("RIP") is nowadays often used to supplement or supplant the role of a computer or printer—or both—in the specialized and extremely processing-intensive work of preparing image data files for use, thereby releasing the printer and computer for other duties. Processors in a computer or RIP typically operate a program known as a "printer driver".

These several processors may or may not include general-purpose multitasking digital electronic microprocessors (usually found in the computer 30) which run software, or general-purpose dedicated processors (usually found in the printer 320) which run firmware, or application-specific integrated circuits (ASICs, also usually in the printer). As is well-understood nowadays, the specific distribution of the tasks of the present invention among all such devices, and still others not mentioned and perhaps not yet known, is primarily a matter of convenience and economics.

On the other hand, sharing is not required. If preferred the system may be designed and constructed for performance of all data processing in one or another of the FIG. 11 modules—in particular, for example, the printer 320.

Regardless of the distributive specifics, the overall system typically includes a memory 232m for holding color-corrected image data. These data may be developed in the computer or raster image processor, for example with specific artistic input by an operator, or may be received from an external source.

Ordinarily the input data proceed from image memory 232m to an image-processing stage 332 that includes some form of program memory 333—whether card memory or hard drive and RAM, or ROM or EPROM, or ASIC structures. The memory 232m provides instructions 334, 335 for automatic operation of rendition 336 and printmasking 337.

Image data cascades through these latter two stages 336, 337 in turn, resulting in new data 339 specifying the colorants to be deposited in each pixel, in each pass of the printhead carriage 20 over the printing medium 41. It remains for these data to be interpreted to form:

actual printhead-actuating signals 53 (for causing precisely timed and precisely energized ink ejection or other colorant deposition 54), actual carriage-drive signals 57 (for operating a carriage-drive motor 35 that produces properly timed motion 55 of the printhead carriage across the printing medium), and actual print-medium-advance signals 46 (for energizing a medium-advance motor 42 that similarly produces suitably timed motion of the print-medium platen 43 and thereby the medium 41).

Such interpretation is performed in the printing control module 40. In addition the printing control module 40 may typically be assigned the tasks of receiving and interpreting the encoder signal 52 fed back from the encoder sensor 233.

The printing-control stage 40 necessarily contains electronics and program instructions for interpreting the colorant-per-pixel-per-pass information 339. Most of this electronics and programming is conventional, and represented in the drawing merely as a block 81 for driving the carriage and pen. That block in fact may be regarded as providing essentially all of the conventional operations of the printing control stage 40.

Figure 11:
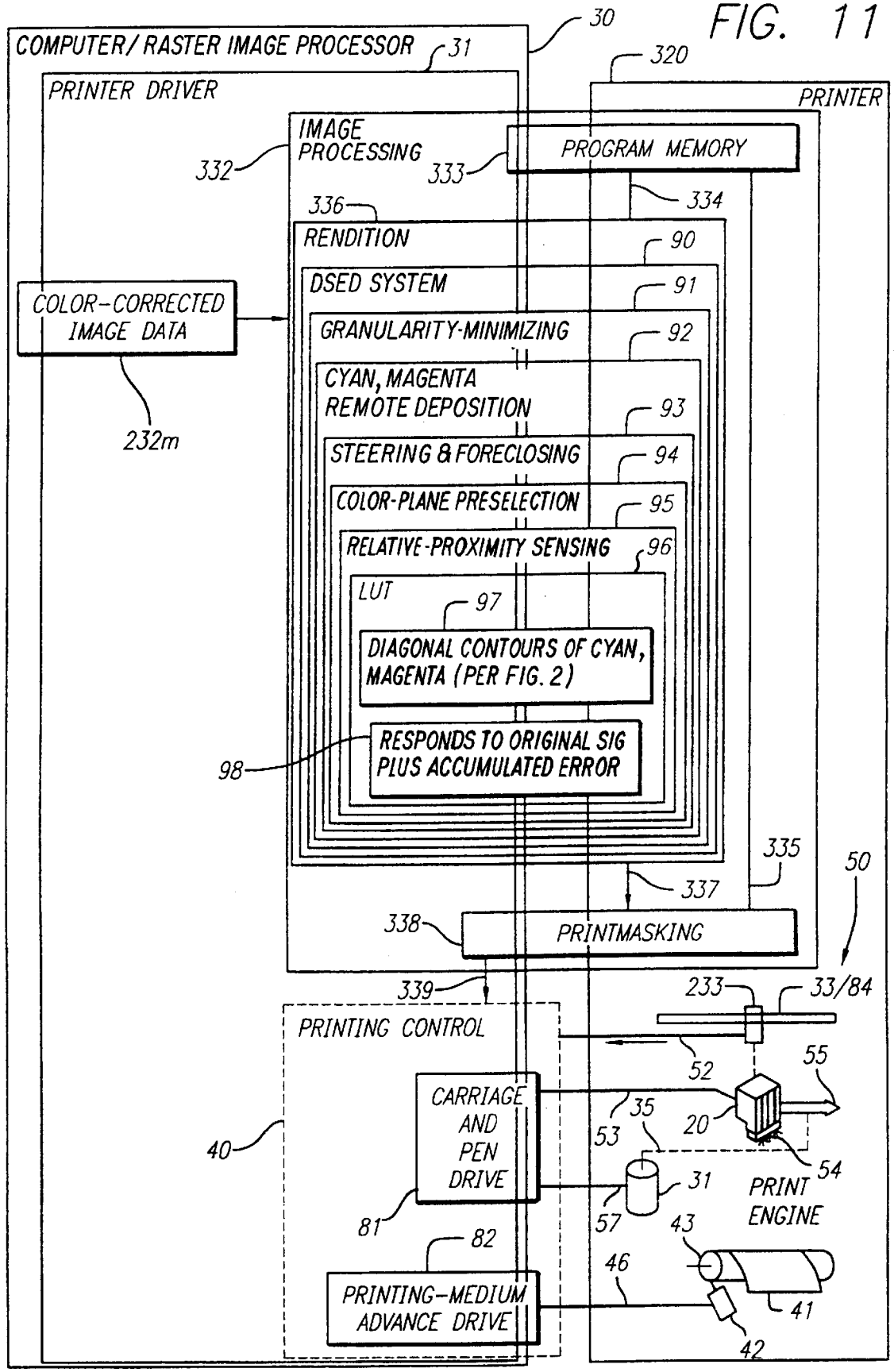
FIG. 11 is a highly schematic block diagram of a printer/plotter in which the relationships of FIGS. 1 through 5 are advantageously implemented, particularly showing key signals flowing from and to one or more digital electronic microprocessors to effectuate printing.

(b) Subsystems for reducing graininess—Also appearing in FIG. 11 are certain specific modules 90–98 implementing preferred embodiments of the present invention. These modules for the most part form a nested group that correspond to successively more specific functions performed by the invention.

Thus the first, topmost level of function within the rendition or halftoning module 336 is the overall DSED (device-state error-diffusion) system 90—such as introduced in the same inventors' aforementioned earlier patent document. Within this system 90 is the topmost level of function that is specific to the present invention, namely a granularity-minimizing function 91.

This function 91, as explained earlier, operates primarily by forcing the deposition of cyan and magenta colorants to be mutually remote. This remote-deposition function 92 in turn is preferably performed through a conceptual steering function, coupled with a conceptual foreclosing function.

Both portions of the dual steering and foreclosing function 93 have also been described earlier. By way of recap, the steering function or subfunction represents a positive side of the broader remote-deposition function 92 (i. e., steering toward a particular favored plane or device state), and the foreclosing function or subfunction represents a negative side of the same remote-deposition behavior 92 (i. e., foreclosing use of a particular disfavored plane or device state).

Within the dual steering/foreclosing function 93, a particularly preferred manner of accomplishing the steering and foreclosing alike is color-plane preselection. It is especially beneficial to preselect color planes or device states for specified input colors or groups of colors, rather than attempting corresponding calculations in real time or "on the fly".

Such preselection 94, in turn, is advantageously done on the basis of determining relative proximity of an input color specification to one or another color plane, axis or device state. This relative-proximity sensing 95, however, again is not beneficially done in real time as for example by calculating three-dimensional distances in color space.

Rather the "sensing" function 95 is preferably accomplished simply by looking up the input color specification in a lookup table (LUT) 96. The table of course must be one that has been precalculated to perform all such computations, as well as taking into account numerous other considerations discussed in the prior document.

In particular it is preferred that the table 96 include cyan and magenta selection entries arrayed along diagonal contours 97 such as shown in FIG. 2. Most preferably the lookup table 96 is utilized by searching its index or entry data for numbers that represent the original signal plus accumulated error from other, previously processed pixels—rather than numbers that represent only the original signal as such.

Figure 15:
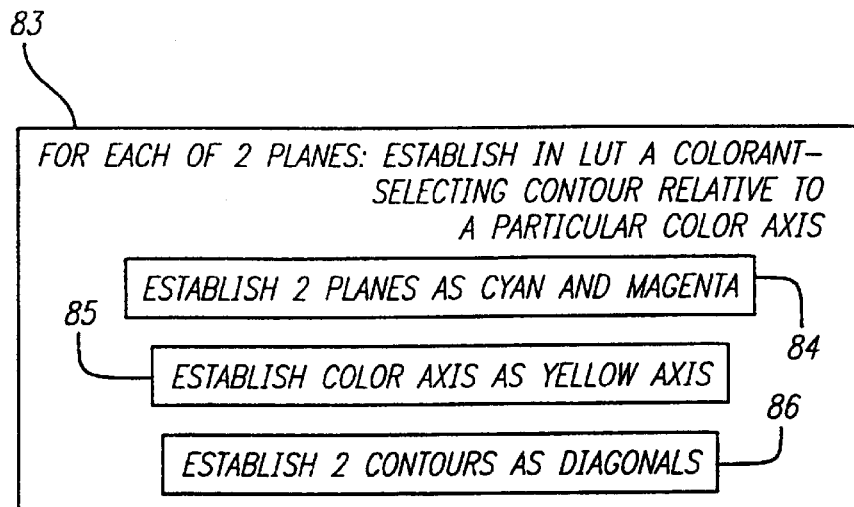
FIG. 15 is a flow chart representing a method aspect of the invention.

(c) Preparation of the lookup table—From the foregoing it will be clear that the LUT 96 may be prepared by a process such as diagramed in FIG. 15. A preliminary and basic step is establishing in the table 96 a colorant-selecting contour relative to a particular color axis— and more particularly, establishing such a contour for each of two planes.

Part of this establishing step 83 is a substep 84 of establishing the two planes as cyan and magenta. Another part is a substep 85 of establishing the particular color axis as a yellow axis.

A particularly critical part of the establishing step 83 is a substep 86 of establishing the two contours as diagonals. This is illustrated in tabular form in FIG. 2, and in graphical form in FIGS. 3 and 4.

Next are the steps 87, 88 of filling in zeroes on one side of each of the contours, and filling in ones on the other side. Those skilled in the art will understand that all of FIG. 15 and the discussion of that drawing is strongly conceptual, and that the steps accordingly may be conceptualized differently and effectively performed in a different sequence, within the scope of the claims.

The above disclosure is intended as merely exemplary, and not to limit the scope of the invention—which is to be determined by reference to the appended claims.

What is claimed is:

1. Incremental printing apparatus comprising:
   a device-state error-diffusion system; and
   a steering arrangement for substantially directly causing the error-diffusion system to respond, to a near-gray or near-yellow input color, with a preselection of one color plane or another color plane, in a predefined color space, substantially without reference to a threshold.

2. Incremental printing apparatus comprising:
   a device-state error-diffusion system; and
   means for substantially directly steering response of the error-diffusion system, to a near-gray or near-yellow input color, toward one or another color plane, substantially without reference to a threshold.

3. The apparatus of claim 2, wherein:
   the steering means comprise means for operating selectively toward said one color plane or toward said another color plane depending on which of the two color planes is closer to an input color signal.

4. The apparatus of claim 3, wherein:
   the steering means comprise means for operating by preselection, based upon relative proximity of the input signal to one of the two color planes; and
   said input signal includes the original signal for a pixel being processed, plus accumulated error distributed to that pixel from other pixels processed previously.

5. The apparatus of claim 3, wherein:
   said steering means in particular portions of said color space substantially foreclosing use of different inks in adjacent pixels, as distinguished from only modifying a likelihood of using different inks in adjacent pixels.

6. The apparatus of claim 3, wherein:
   in particular portions of color space the steering means comprise means for generally foreclosing use of different inks in adjacent pixels, as distinguished from only modifying a likelihood of using different inks in adjacent pixels.

7. The apparatus of claim 6, wherein:
   said particular portions of color space are near a yellow axis.

8. The apparatus of claim 7, wherein:
   the steering means comprise portions of a lookup table.

9. The apparatus of claim 2, wherein:
   in particular portions of color space the steering means comprise means for substantially foreclosing use of different inks in adjacent pixels, as distinguished from only modifying a likelihood of using different inks in adjacent pixels.

10. The apparatus of claim 9, wherein:
said particular portions of color space are near a yellow axis.
11. The apparatus of claim 10, wherein:
the steering means comprise portions of a lookup table.
12. The apparatus of claim 2, wherein:
the steering means comprise portions of a lookup table.
13. The apparatus of claim 2, wherein:
said one color plane is a cyan plane; and
said another color plane is a magenta plane.
14. The apparatus of claim 13, wherein:
the steering means comprise means for operating only near a yellow axis.
15. Incremental printing apparatus comprising:
a device-state error-diffusion system; and
a foreclosing arrangement for generally, with respect to particular portions of color space, preventing use of different color inks in adjacent pixels, as distinguished from only modifying a likelihood of using different inks in adjacent pixels.
16. Incremental printing apparatus comprising:
a device-state error-diffusion system; and
color-space means for selectively foreclosing use of different color inks in adjacent pixels, as distinguished from only modifying a likelihood of using different inks in adjacent pixels.
17. Incremental printing apparatus comprising:
a device-state error-diffusion system; and
means for generally, with respect to particular portions of color space, foreclosing use of different color inks in adjacent pixels, as distinguished from only modifying a likelihood of using different inks in adjacent pixels.
18. The apparatus of claim 17, wherein:
the foreclosing means comprise means for operating selectively toward said one or another color plane depending on which of two color signals is bigger.
19. The apparatus of claim 18, wherein:
said particular portions of color space are near a yellow axis.
20. The apparatus of claim 19, wherein:
the foreclosing means comprise portions of a lookup table.
21. The apparatus of claim 17, wherein:
the foreclosing means comprise portions of a lookup table.
22. Incremental printing apparatus comprising:
a device-state error-diffusion system; and
a minimizing arrangement for causing granularity in highlight or near-yellow regions of a printed image to be substantially as small as possible by causing cyan colorant and magenta colorant in highlight or near-yellow regions to be deposited exclusively remote from one another.
23. Incremental printing apparatus comprising:
a device-state error-diffusion system; and
means for minimizing granularity in highlight or near-yellow regions of a printed image by causing cyan colorant and magenta colorant in highlight or near-yellow regions to be deposited exclusively remote from one another.
24. The apparatus of claim 23, wherein:
the minimizing means comprise contours of permitted cyan and magenta colorant deposition within a lookup table that controls the system.
25. The apparatus of claim 24, wherein:
the contours are substantially diagonal.
26. The apparatus of claim 25, wherein:
the lookup table has a $Y_i=0$ layer that includes portions substantially as shown below

| C inkdrops | M inkdrops |
| --- | --- |
| 0000000000000000 | 0111111111112234 |
| 1100000000000000 | 0011111111112234 |
| 1110000000000000 | 0001111111112234 |
| 1111000000000000 | 0000111111112234 |
| 1111100000000000 | 0000011111112234 |
| 1111111111111111 | 0000001111112234 |
| 1111111111111111 | 0000001111112234 |
| 1111111111111111 | 0000001111112234 |
| 1111111111111111 | 0000001111112234 |
| 1111111111111111 | 0000001111112234 |
| 1111111111111111 | 0000001111112234 |
| 2222222222222222 | 0000001111112234 |
| 2222222222222222 | 0000001111112234 |
| 3333332333333333 | 0000001111112234 |
| 3333333333333333 | 0000001111112234 |
| 4444444444444444 | 0000001111112234. |

27. A method of preestablishing a lookup table for use by a device-state error-diffusion algorithm for an incremental printing apparatus; said method comprising:
for each of two color planes, establishing in the lookup table a respective contour that defines a selection of colorants near a particular color axis; the two respective contours representing mutually exclusive complementary selections; and
in each of said two color planes, filling in zeroes on one side of a respective one of said contours and filling in ones on the other side of said respective one of said contours, near said particular color axis.
28. The method of claim 27, wherein:
the establishing step establishes said two color planes as cyan and magenta planes, respectively; and
said particular color axis is a yellow axis.
29. The method of claim 28, wherein:
the establishing step establishes both said two respective contours as diagonals.
30. The method of claim 27, wherein:
the establishing step establishes both said two respective contours as diagonals.
31. A method of reducing image granularity in a printed image formed from a plurality of droplets of cyan ink, magenta ink and yellow ink; said method comprising:
establishing a halftoning table for facilitating the converting of a fine-resolution color value to a coarse-resolution color value, said halftoning table having a plurality of device-state error-diffusion values; and
selecting from said halftoning table a device-state composed of only one drop of cyan or magenta if a cyan color value in said fine-resolution color value exceeds or equals a magenta color value in said fine-resolution color value, and otherwise selecting another device-state composed of only one drop of magenta or cyan respectively;
wherein the selection of either said threshold device-state error diffusion value or said another threshold device-state error diffusion value facilitates the printing of the inkjet image, where each droplet of magenta ink is spaced a maximum distance from each droplet of cyan ink.

32. A method of reducing image granularity in a printed inkjet image; said method comprising:

establishing a halftoning table for facilitating the converting of a fine-resolution color value to a coarse-resolution color value, said halftoning table having a plurality of device-state error-diffusion values;

selecting from said halftoning table a device-state composed of only one drop of cyan or magenta if a cyan color value in said fine-resolution color value exceeds or equals a magenta color value in said fine-resolution color value, and otherwise selecting another device-state composed of only one drop of magenta or cyan respectively;

wherein the selection of either said device-state composed of only one drop of cyan or magenta or said another device-state composed of only one drop of magenta or cyan respectively facilitates the printing of the inkjet image having adjacent droplets of cyan ink and magenta ink distributed in a substantially spatially even pattern.

* * * * *